US009094052B1

(12) United States Patent
Hsu et al.

(10) Patent No.: US 9,094,052 B1
(45) Date of Patent: Jul. 28, 2015

(54) METHOD OF WIRELESS CONNECTION ESTABLISHMENT AND DATA EXCHANGE BETWEEN DISPLAY DEVICE AND MOBILE DEVICE

(71) Applicant: Top Victory Investments Ltd., Kowloon (HK)

(72) Inventors: Hung-Wang Hsu, New Taipei (TW); Shih-Chieh Hsiao, New Taipei (TW)

(73) Assignee: Top Victory Investment Ltd., Kowloon (HK)

( * ) Notice: Subject to any disclaimer, the term of this patent is extended or adjusted under 35 U.S.C. 154(b) by 0 days.

(21) Appl. No.: 14/250,421

(22) Filed: Apr. 11, 2014

(51) Int. Cl.
*H04B 5/00* (2006.01)
*H04W 8/24* (2009.01)
*H04W 84/18* (2009.01)

(52) U.S. Cl.
CPC .............. *H04B 5/0031* (2013.01); *H04W 8/24* (2013.01); *H04W 84/18* (2013.01)

(58) Field of Classification Search
CPC ....... H04B 5/02; H04B 5/0031; H04W 84/18; H04W 8/24
USPC ......................................................... 455/41.1
See application file for complete search history.

(56) References Cited

U.S. PATENT DOCUMENTS

| 8,401,681 | B2 * | 3/2013 | Rosenblatt et al. | 700/94 |
| 2012/0289155 | A1 * | 11/2012 | Dua | 455/41.1 |
| 2012/0315848 | A1 * | 12/2012 | Smith et al. | 455/41.1 |
| 2013/0183899 | A1 * | 7/2013 | Gorsev | 455/41.1 |
| 2013/0225077 | A1 * | 8/2013 | Schultz et al. | 455/41.1 |
| 2013/0267168 | A1 * | 10/2013 | Jeon et al. | 455/41.1 |

* cited by examiner

*Primary Examiner* — April G Gonzales
(74) *Attorney, Agent, or Firm* — Alan D. Kamrath; Kamrath IP Lawfirm, P.A.

(57) ABSTRACT

A method of wireless connection establishment and data exchange between a display device and a mobile device is provided, including: moving the mobile device close to a remote control device to establish an NFC connection therebetween; the mobile device converting data therein into NFC data to transmit to the remote control device via the NFC connection; the remote control device encoding the NFC data to generate a remote signal to transmit in a wireless fashion; the display device receiving and decoding the remote signal to obtain the NFC data, and analyzing the NFC data to obtain the data to perform corresponding NFC functions. Therefore, a user may use NFC functions of the display device via the remote control device by moving the mobile device close to the remote control device. If the data obtained by the display device includes Wi-Fi or Bluetooth connection establishment information, a Wi-Fi or Bluetooth connection may be established between the display device and the mobile device.

10 Claims, 4 Drawing Sheets

METHOD OF WIRELESS CONNECTION ESTABLISHMENT AND DATA EXCHANGE BETWEEN DISPLAY DEVICE AND MOBILE DEVICE

BACKGROUND OF THE INVENTION

1. Field of the Invention

The invention relates to a method of wireless connection establishment and data exchange between devices. More particularly, the invention relates to a method of wireless connection establishment and data exchange between a display device and a mobile device.

2. Description of the Related Art

Nowadays, there are two commonly-used types of wireless data transmissions supported by display devices. One type is short/middle-distance wireless transmission like Wi-Fi or Bluetooth, which needs to perform at least one authentication action, and then may perform data exchange action after passing authentication. Another type is short-distance wireless transmission like near field communication (NFC), which may perform data exchange action without authentication action because it is limited to use within a short range. In the above-mentioned commonly-used types of wireless data transmissions, there exist different degrees of inconvenience for a user of a display device, so the user cannot easily finish setting up a wireless connection to establish the wireless connection. If no wireless connection is established, some functions of a display device could not be exerted sufficiently.

For example, when performing Wi-Fi or Bluetooth authentication action, a user needs to operate keys of a remote control device for a display device, or to operate keys or a touch panel of the display device, to manually input authentication or setup information into the display device. The manual input operations easily make the user feel inconvenience. Because NFC is limited to use within a short range, a user needs to walk to be in front of the display device and move a mobile device having an NFC function close to the display device for a period of time until finishing data exchange, or even move the mobile device close to a specific area of the display device, where an NFC interface is disposed. The operations easily fail because the user is not familiar with the position of the NFC interface disposed on the display device, and easily make the user feel inconvenience because he or she needs to be close to the display device when establishing the NFC connection every time.

Recently, a method of Wi-Fi or Bluetooth connection establishment by using NFC is developed. A user manually pre-inputs or pre-downloads Wi-Fi or Bluetooth connection establishment information including authentication or setup information into a mobile device, and then moves the mobile device close to a display device to transmits, via an NFC connection, the Wi-Fi or Bluetooth connection establishment information to the display device to establish a Wi-Fi or Bluetooth connection between the display device and the mobile device to perform data exchange action. Although the method may simplify the conventional operations of establishing the Wi-Fi or Bluetooth connection, the user still encounters the problem of the conventional operations of establishing the NFC connection, resulting in reduced acceptability and practicability.

SUMMARY OF THE INVENTION

The invention is adapted to providing a method of wireless connection establishment and data exchange between a display device and a mobile device, which may simplify the conventional operations of establishing the Wi-Fi or Bluetooth connection, and avoid the problem of the conventional operations of establishing the NFC connection.

According to an aspect of the invention, there is provided a method of wireless connection establishment and data exchange between a display device and a mobile device. The method includes:

providing the display device, the mobile device, and a remote control device for the display device, wherein the display device includes a first NFC interface, a processor and a receiver; the mobile device includes a second NFC interface; the remote control device includes a third NFC interface, a controller and a transmitter;

moving the mobile device close to the remote control device to establish an NFC connection between the mobile device and the remote control device;

the mobile device converting data therein into NFC data and transmitting, via the NFC connection, the NFC data from the second NFC interface to the third NFC interface of the remote control device;

the controller of the remote control device encoding the received NFC data to generate a remote signal and controlling the transmitter to transmit the remote signal in a wireless fashion;

the receiver of the display device receiving the remote signal transmitted from the remote control device and sending the received remote signal to the processor; and the processor of the display device decoding the received remote signal to obtain the NFC data and analyzing the obtained NFC data to obtain the data.

According to another aspect of the invention, the data in the mobile device includes Wi-Fi or Bluetooth connection establishment information which is pre-input or pre-downloaded.

According to another aspect of the invention, the method further includes: the processor of the display device controlling, according to the Wi-Fi or Bluetooth connection establishment information in the obtained data, to establish a Wi-Fi or Bluetooth connection between the display device and the mobile device.

According to another aspect of the invention, the controller of the remote control device encrypts and then encodes the received NFC data to generate the remote signal. The processor of the display device decodes and then decrypts the received remote signal to obtain the NFC data.

According to another aspect of the invention, the display device includes a television or a computer monitor.

According to another aspect of the invention, the mobile device includes a mobile phone.

According to another aspect of the invention, the mobile device is replaced by a contactless smart card.

According to another aspect of the invention, the processor of the display device includes a system-on-chip (SoC).

According to another aspect of the invention, the controller of the remote control device includes a microcontroller unit (MCU).

According to another aspect of the invention, the receiver of the display device includes an infrared (IR) receiver. The transmitter of the remote control device includes an IR transmitter corresponding to the IR receiver.

It is remarked that the above mentioned aspects or features can also be combined with each other and are in the scope of the invention as well.

By disposing an NFC interface (i.e., the above-mentioned third NFC interface) in the remote control device, and by adding functions to firmware of the controller of the remote control device so that the controller may detect NFC events and process data, the mobile device may convert data therein into NFC data to transmit to the remote control device, and then the remote control device may transmit the NFC data to the display device by using conventional remote control technology like consumer IR (CIR) technology. In addition, by adding functions to firmware of the processor of the display device, the processor may analyze the NFC data transmitted from the remote control device and control the display device to perform corresponding built-in NFC functions like updating, if necessary, pre-stored NFC data in the display device. Because both the mobile device and the remote control device are handheld devices and the remote control device has small size, a user may easily move the mobile device and/or the remote control device to modulate their positions and the distance therebetween to perform NFC functions built in the display device, rather than move the mobile device close to the display device or even close to the specific area of the display device, where another NFC interface (i.e., the first NFC interface) is disposed, to establish an NFC connection, resulting in more convenience to the user, and increased acceptability and practicability.

Furthermore, when both the display device and the mobile device have Wi-Fi or Bluetooth interfaces, if the processor of the display device analyzes NFC data transmitted from the remote control device to obtain Wi-Fi or Bluetooth connection establishment information, the processor may establish a Wi-Fi or Bluetooth connection between the display device and the mobile device according to the Wi-Fi or Bluetooth connection establishment information, rather than manually input authentication or setup information into the display device to establish the Wi-Fi or Bluetooth connection, resulting in more convenience to the user, and increased acceptability and practicability.

BRIEF DESCRIPTION OF THE DRAWINGS

The invention will be described in further detail below under reference to the accompanying drawings, in which.

DETAILED DESCRIPTION OF THE INVENTION

Figure 1:
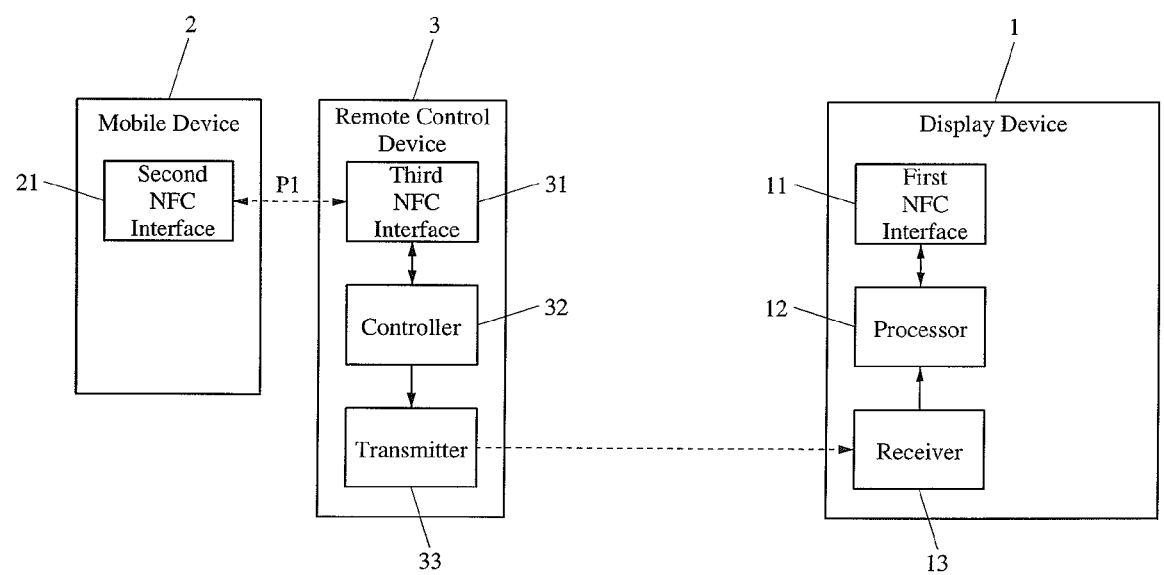
FIG. 1 is a block diagram illustrating a display device, a mobile device and a remote control device according to an exemplary embodiment of the invention.

Reference will now be made in detail to several embodiments of the invention that are illustrated in the accompanying drawings. Wherever possible, same or similar reference numbers are used in the drawings and the description to refer to the same or like parts or steps. In addition, for purposes of clarity and simplification, the drawings are in simplified form and are not to precise scale or shape.

Figure 2:
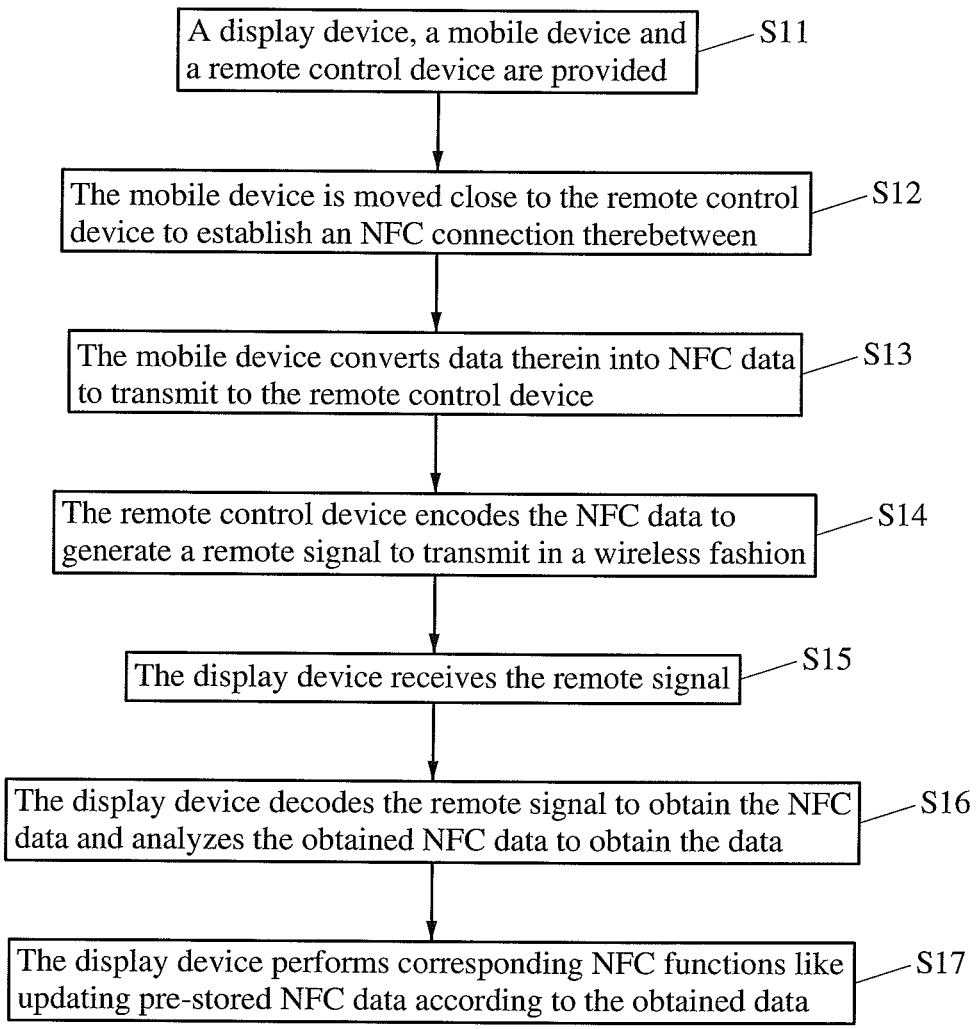
FIG. 2 is a flowchart illustrating a method of wireless connection establishment and data exchange between the display device and the mobile device as shown in FIG. 1 according to an exemplary embodiment of the invention.

FIG. 1 is a block diagram illustrating a display device, a mobile device and a remote control device according to an exemplary embodiment of the invention; FIG. 2 is a flowchart illustrating a method of wireless connection establishment and data exchange between the display device and the mobile device as shown in FIG. 1 according to an exemplary embodiment of the invention. Referring to FIGS. 1 and 2, in the embodiment, the method of wireless connection establishment and data exchange between the display device and the mobile device includes steps S11 through S17. At step S11, the display device 1, the mobile device 2, and the remote control device 3 for the display device 1 are provided. The display device 1 includes a first NFC interface 11, a processor 12 and a receiver 13. The mobile device 2 includes a second NFC interface 21. The remote control device 3 includes a third NFC interface 31, a controller 32 and a transmitter 33. In an embodiment, the display device 1 may be a television, a computer monitor or other type of display device. The mobile device 2 may be a mobile phone, a personal digital assistant (PDA) or other type of mobile device; moreover, the mobile device 2 may be replaced by a contactless smart card using, for example, radio-frequency identification (RFID) technology. The processor 12 of the display device 1 may be an SoC or other type of processor. The controller 32 of the remote control device 3 may be an MCU or other type of controller. The receiver 13 of the display device 1 and the transmitter 33 of the remote control device 3 may be an IR receiver and an IR transmitter corresponding to each other respectively, or other type of receiver and transmitter.

At step S12, a user moves the mobile device 2 close to the remote control device 3. Because NFC is limited to use within a short range, an NFC connection P1 is established between the mobile device 2 and the remote control device 3 to perform data exchange action without authentication action. And, because both the mobile device 2 and the remote control device 3 are handheld devices and the remote control device 3 has small size, the user may easily move the mobile device 2 and/or the remote control device 3 to modulate their positions and the distance therebetween to establish the NFC connection P1, rather than move the mobile device 2 close to the display device 1 or even close to the specific area of the display device 1, where the first NFC interface 11 is disposed, to establish an NFC connection. At step S13, when the NFC connection P1 is established between the mobile device 2 and the remote control device 3, the mobile device 2 may convert data therein into NFC data and transmit, via the NFC connection P1, the NFC data from the second NFC interface 21 to the third NFC interface 31 of the remote control device 3.

At step S14, the controller 32 of the remote control device 3 encodes the received NFC data to generate a remote signal and controls the transmitter 33 to transmit the remote signal in a wireless fashion. At step S15, the receiver 13 of the display device 1 receives the remote signal transmitted from the remote control device 3 and sends the received remote signal to the processor 12. If the transmitter 33 and the receiver 13 are an IR transmitter and an IR receiver respectively, the remote signal transmitted from the transmitter 33 is an IR remote signal. At step S16, the processor 12 of the display device 1 decodes the received remote signal to obtain the NFC data and analyzes the obtained NFC data to obtain the data. In another embodiment, the controller 32 of the remote control device 3 may encrypt and then encode the received NFC data to generate the remote signal while the processor 12 of the display device 1 may correspondingly decode and then decrypt the received remote signal to obtain the NFC data.

Finally, at step S17, the processor 12 of the display device 1 controls, according to the obtained data (obtained by analyzing the obtained NFC data), the display device 1 to perform corresponding built-in NFC functions like updating, if necessary, pre-stored NFC data in the display device 1. Therefore, by combining the remote control device 3 and the NFC technology, the user may use corresponding built-in NFC functions of the display device 1 via the remote control device 3 by moving the mobile device 2 close to the remote control device 3, rather than move the mobile device 2 close to the display device 1 or even close to the specific area of the display device 1, where the first NFC interface 11 is disposed, to establish an NFC connection, resulting in more convenience to the user, and increased acceptability and practicability.

Figure 3:
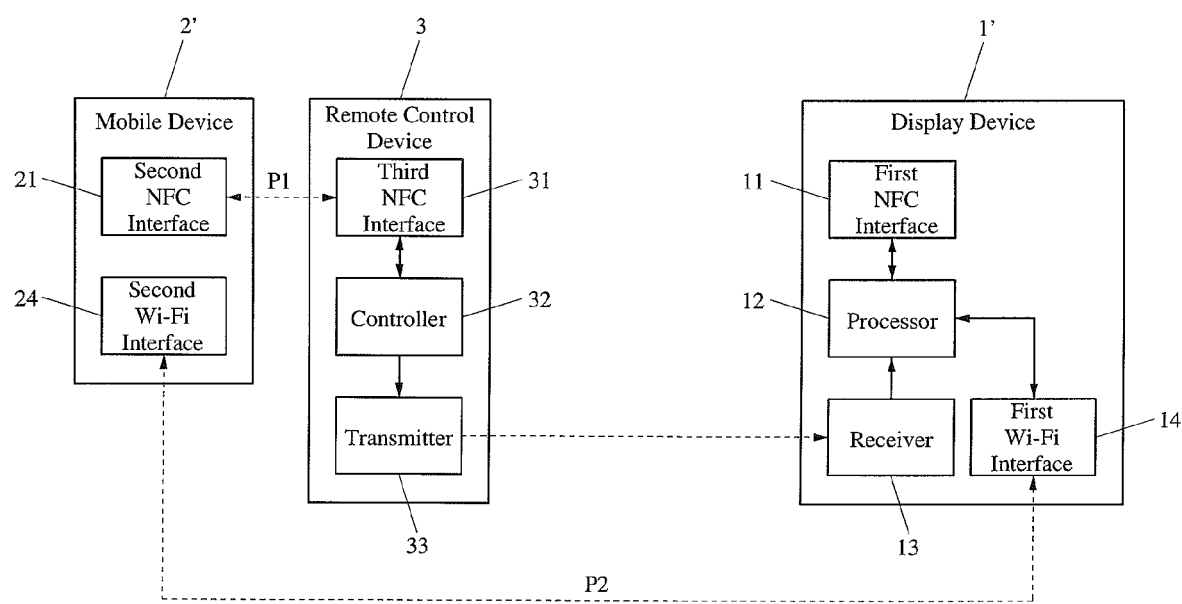
FIG. 3 is a block diagram illustrating a display device, a mobile device and a remote control device according to another exemplary embodiment of the invention.
Figure 4:
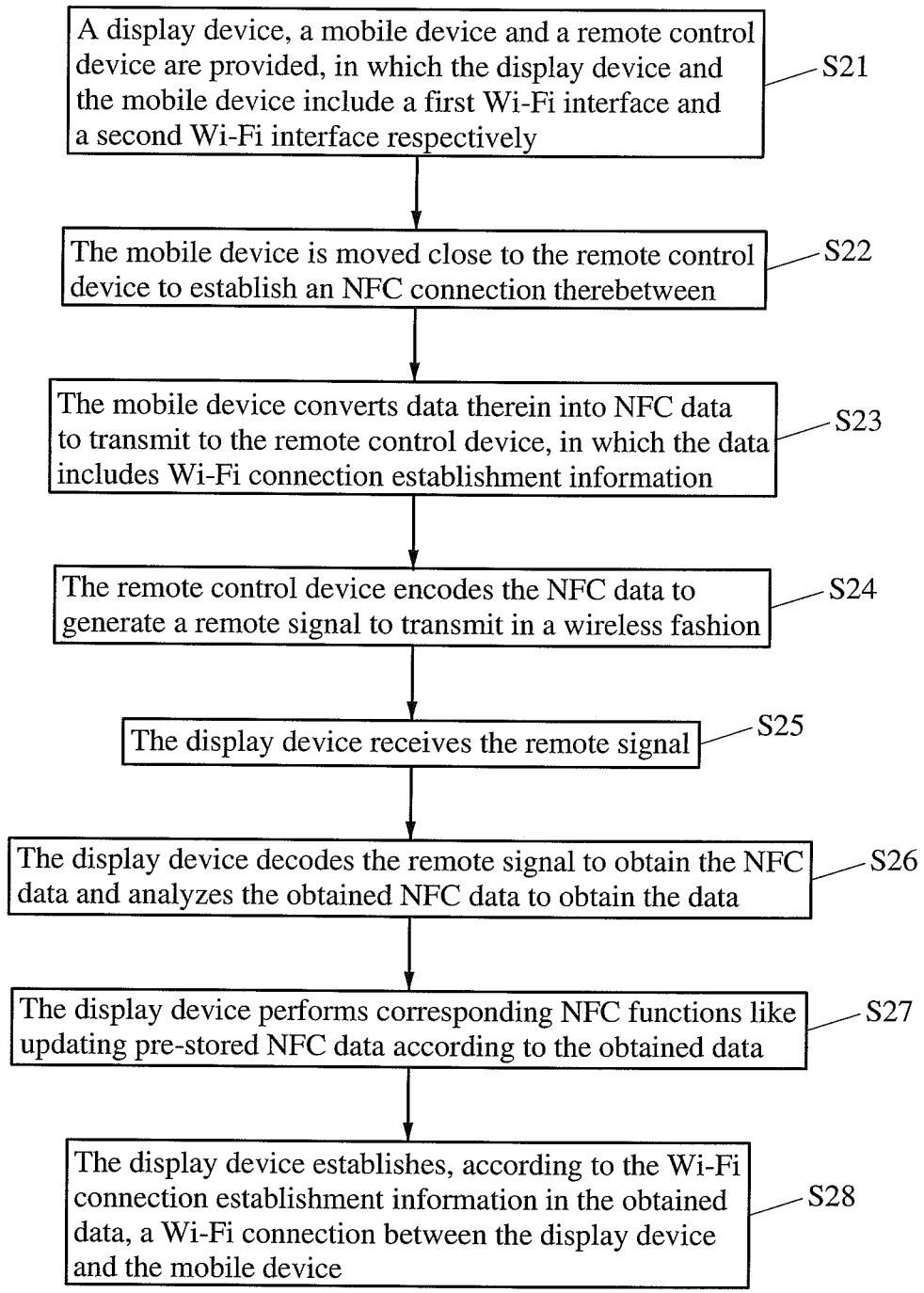
FIG. 4 is a flowchart illustrating a method of wireless connection establishment and data exchange between the display device and the mobile device as shown in FIG. 3 according to another exemplary embodiment of the invention.

FIG. 3 is a block diagram illustrating a display device, a mobile device and a remote control device according to another exemplary embodiment of the invention; FIG. 4 is a flowchart illustrating a method of wireless connection establishment and data exchange between the display device and the mobile device as shown in FIG. 3 according to another exemplary embodiment of the invention. Referring to FIGS. 3 and 4, in the embodiment, the method of wireless connection establishment and data exchange between the display device and the mobile device includes steps S21 through S28. At step S21, the display device 1', the mobile device 2' and the remote control device 3 for the display device 1' are provided. The display device 1' includes the first NFC interface 11, the processor 12, the receiver 13 and a first Wi-Fi interface 14. The mobile device 2' includes the second NFC interface 21 and a second Wi-Fi interface 24. The remote control device 3 includes the third NFC interface 31, the controller 32 and the transmitter 33. In another embodiment, each of the first Wi-Fi interface 14 of the display device 1' and the second Wi-Fi interface 24 of the mobile device 2' may be replaced by other type of short/middle-distance wireless transmission interface like Bluetooth interface. It is noted that, comparing with the block diagram as shown FIG. 1, in the block diagram as shown FIG. 3, the display device 1' further includes the first Wi-Fi interface 14, and the mobile device 2' further includes the second Wi-Fi interface 24.

At step S22, a user moves the mobile device 2' close to the remote control device 3. Because NFC is limited to use within a short range, an NFC connection P1 is established between the mobile device 2' and the remote control device 3 to perform data exchange action without authentication action. And, because both the mobile device 2' and the remote control device 3 are handheld devices and the remote control device 3 has small size, the user may easily move the mobile device 2' and/or the remote control device 3 to modulate their positions and the distance therebetween to establish the NFC connection P1, rather than move the mobile device 2' close to the display device 1' or even close to the specific area of the display device 1', where the first NFC interface 11 is disposed, to establish an NFC connection. At step S23, when the NFC connection P1 is established between the mobile device 2' and the remote control device 3, the mobile device 2' may convert data therein into NFC data and transmit, via the NFC connection P1, the NFC data from the second NFC interface 21 to the third NFC interface 31 of the remote control device 3. Because the mobile device 2' includes the second Wi-Fi interface 24, the user may manually pre-input or pre-download Wi-Fi connection establishment information into the mobile device 2', and the mobile device 2' may convert the data including the Wi-Fi connection establishment information into the NFC data and transmit to the remote control device 3.

At step S24, the controller 32 of the remote control device 3 encodes the received NFC data to generate a remote signal and controls the transmitter 33 to transmit the remote signal in a wireless fashion. At step S25, the receiver 13 of the display device 1' receives the remote signal transmitted from the remote control device 3 and sends the received remote signal to the processor 12. At step S26, the processor 12 of the display device 1' decodes the received remote signal to obtain the NFC data and analyzes the obtained NFC data to obtain the data. In another embodiment, the controller 32 of the remote control device 3 may encrypt and then encode the received NFC data to generate the remote signal while the processor 12 of the display device 1' may correspondingly decode and then decrypt the received remote signal to obtain the NFC data.

Finally, at step S27, the processor 12 of the display device 1' controls, according to the obtained data (obtained by analyzing the obtained NFC data), the display device 1' to perform corresponding built-in NFC functions like updating, if necessary, pre-stored NFC data in the display device 1'. Because the obtained data includes the Wi-Fi connection establishment information and the display device 1' includes the first Wi-Fi interface 14, at step S28, the processor 12 of the display device 1' may control, according to the Wi-Fi connection establishment information in the obtained data, the display device 1' to establish a Wi-Fi connection P2 between the display device 1' and the mobile device 2', so the display device 1' and the mobile device 2' may directly perform data exchange via the Wi-Fi connection P2. Therefore, by combining the remote control device 3 and the NFC technology, the user may move the mobile device 2' close to the remote control device 3 to establish, via the remote control device 3, the Wi-H connection P2 between the display device 1' and the mobile device 2', rather than manually input authentication or setup information into the display device 1' to establish the Wi-Fi connection P2, resulting in more convenience to the user, and increased acceptability and practicability.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of wireless connection establishment and data exchange between a display device and a mobile device, comprising:

providing the display device, the mobile device, and a remote control device for the display device, wherein the display device comprises a first near field communication (NFC) interface, a processor and a receiver; the mobile device comprises a second NFC interface; the remote control device comprises a third NFC interface, a controller and a transmitter;

moving the mobile device close to the remote control device to establish an NEC connection between the mobile device and the remote control device;

the mobile device converting data therein into NFC data and transmitting, via the NFC connection, the NFC data from the second NFC interface to the third NFC interface of the remote control device;

the controller of the remote control device encoding the received NFC data to generate a remote signal and controlling the transmitter to transmit the remote signal in a wireless fashion;

the receiver of the display device receiving the remote signal transmitted from the remote control device and sending the received remote signal to the processor; and the processor of the display device decoding the received remote signal to obtain the NFC data and analyzing the obtained NFC data to obtain the data.

2. The method of claim 1, wherein the data in the mobile device comprises Wi-Fi or Bluetooth connection establishment information which is pre-input or pre-downloaded.

3. The method of claim 2, further comprising: the processor of the display device controlling, according to the Wi-Fi or Bluetooth connection establishment information in the obtained data, to establish a Wi-Fi or Bluetooth connection between the display device and the mobile device.

4. The method of claim 1, wherein the controller of the remote control device encrypts and then encodes the received NFC data to generate the remote signal; the processor of the display device decodes and then decrypts the received remote signal to obtain the NFC data.

5. The method of claim 1, wherein the display device comprises a television or a computer monitor.

6. The method of claim 1, wherein the mobile device comprises a mobile phone.

7. The method of claim 1, wherein the mobile device is replaced by a contactless smart card.

8. The method of claim 1, wherein the processor of the display device comprises a system-on-chip (SoC).

9. The method of claim 1, wherein the controller of the remote control device comprises a microcontroller unit (MCU).

10. The method of claim 1, wherein the receiver of the display device comprises an infrared (IR) receiver; the transmitter of the remote control device comprises an IR transmitter corresponding to the IR receiver.

* * * * *